United States Patent [19]

Shimada et al.

[11] 4,389,521

[45] Jun. 21, 1983

[54] PROCESS FOR PREPARING A CYCLIC AMIDE POLAR SOLVENT COMPOSITION

[75] Inventors: Keizo Shimada; Hiroshi Mera, both of Iwakuni; Tsutomu Nakamura, Yamaguchi; Akihiro Aoki, Iwakuni, all of Japan

[73] Assignee: Teijin Limited, Yamaguchi, Japan

[21] Appl. No.: 322,892

[22] Filed: Nov. 19, 1981

Related U.S. Application Data

[63] Continuation-in-part of Ser. No. 131,642, Mar. 19, 1980, abandoned.

[30] Foreign Application Priority Data

Mar. 26, 1979 [JP] Japan .................................. 54-34214
Apr. 18, 1979 [JP] Japan .................................. 54-46745

[51] Int. Cl.$^3$ ............................................. C08G 69/26
[52] U.S. Cl. ..................................... 528/336; 528/179; 528/182; 528/183; 528/220; 528/224; 528/313; 528/314; 528/315; 524/708; 524/714; 524/718; 524/726; 524/728
[58] Field of Search ............... 528/336, 179, 182, 183, 528/220, 224, 313, 314, 315; 524/708, 714, 718, 726, 728

[56] References Cited

U.S. PATENT DOCUMENTS

| | | | |
|---|---|---|---|
| 3,360,598 | 12/1967 | Earnhardt | 264/205 |
| 3,991,037 | 11/1976 | Eckhardt | 264/184 |
| 4,297,479 | 10/1981 | Rochina et al. | 528/336 |
| 4,308,374 | 12/1981 | Vollbracht et al. | 528/336 |

Primary Examiner—Harold D. Anderson
Attorney, Agent, or Firm—Burgess, Ryan and Wayne

[57] ABSTRACT

An aromatic and/or heterocyclic polyamide-amide type polar solvent composition is prepared by prepolymerizing an aromatic or heterocyclic diamine with an aromatic or heterocyclic or heterocyclic dicarboxylic acid chloride in a smaller molar equivalent than that of the diamine to prepare a prepolymer solution having a solution viscosity of 20 poise or less; by removing a by-product, hydrochloric acid, from the resultant prepolymer solution by neutralizing it with ammonia to such an extent that the pH of a mixture of 10 g of the neutralized mixture with 200 ml of water becomes 3.7 to 8.0; by high polymerizing the prepolymer with an additional amount of aromatic or heterocyclic dicarboxylic acid chloride, and; finally, by converting the entire amount of hydrochloric acid and 10 to 70% $NH_4Cl$ in the resultant polyamide solution into an amide type polar solvent-soluble salt, with a neutralizing agent, the amount of the salt being in a range of from 5 to 95% by weight of the theoretical amount of the salt to be derived from the entire amount of the dicarboxylic acid chloride.

29 Claims, 4 Drawing Figures

PROCESS FOR PREPARING A CYCLIC AMIDE POLAR SOLVENT COMPOSITION

This is a continuation-in-part application of our application Ser. No. 131,642, filed on Mar. 19, 1980, now abandoned.

FIELD OF THE INVENTION

The present invention relates to a process for preparing a composition comprising a cyclic amide polymer and an amide type polar solvent. More particularly, the present invention relates to a process for preparing a composition which comprises a cyclic amide polymer, such as an aromatic polyamide and hetrocyclic polyamide, and an amide type polar solvent and which is useful for producing shaped articles, such as fibers, tapes, films and fibrids, having excellent thermal properties and mechanical properties.

BACKGROUND OF THE INVENTION

It is known that the cyclic amide polymer resins, such as aromatic polyamide resins and heterocyclic polyamide resins, exhibit excellent thermal properties, for example, a high melting point, an excellent heat resistance and an excellent flame resistance. Also, it is known that the cyclic amide polymer resins are soluble in amide type polar solvents and the resultant solutions can be utilized for producing shaped articles, such as fibers, fibrids, tapes and films, by various solution shaping methods.

Especially, poly-m-phenyleneisophthalamide type polyamides are useful for producing shaped articles and can be industrially produced by either one of the following two methods A and B.

Method A

A solution of a poly-m-phenyleneisophthalamide is prepared by polymerizing m-phenylene diamine with isophthalic acid chloride in a polar solvent consisting of N,N-dimethylacetamide by a low temperature solution polymerization method. The solution contains, as a polymerization by-product, hydrochloric acid released from the aromatic diamine and the dicarboxylic acid chloride. The hydrochloric acid in the solution is neutralized with calcium dihydroxide. The resultant solution, containing the polyamide and the resultant calcium chloride, can be utilized for producing solid filaments by a dry spinning method and the resultant filaments are washed, drawn and heat-set. The above-mentioned method A is disclosed in U.S. Pat. No. 3,360,598.

Method B

Poly-m-phenyleneisophthalamide is prepared by polymerizing a m-phenylene diamine salt with isophthalic acid chloride in an organic solvent which exhibits a poor capability of dissolving the above-mentioned prepolymer. The resultant prepolymerization mixture is brought into contact with an aqueous solution containing an inorganic acid-acceptor and a water-soluble neutral salt, to prepare and isolate from the mixture the poly-m-phenyleneisophthalamide in the form of solid fine particles. The isolated polyamide is dissolved in an amide type polar solvent, and the resultant solution is used for producing shaped articles, for example, fibers. This method is disclosed in Japanese Patent Application Publication No. 48-17551 (1973).

The above-discribed two method will now be discussed.

Method A is advantageous in that the resultant polyamide solution per se can be utilized as a shaping solution for producing shaped articles. However, in the case of the production of fibers or filaments, the polyamide solution of Method A can be used only for a dry spinning process, because this polyamide solution is not suitable for a wet spinning process. In the dry-spinning process, the solvent is evaporated from the solution. Usually, the amide type polar solvents exhibit a high boiling point. Therefore, the evaporation of the polar solvent causes the cost of the fiber-producing process to be high. Also, it is known that, in the dry-spinning process, it is preferable that a spinning orifice have a small number of spinning holes. If the number of spinning holes in each spinning orifice is too large, the stability of the spinning process, that is, the processability in the spinning process, becomes significantly poor.

The above-mentioned disadvantages of Method A can be eliminated by Method B. However, Method B is disadvantageous in that the solvent used in the polymerization process is different from the amide type polar solvent used in the shaping process. Also, the preparation of the shaping solution, by dissolving the isolated polyamide in an amide type polar solvent, must be carefully controlled, because sometimes the polymer and the solvent undesirably interact with each other. This feature of Method B is disclosed in Japanese Patent Application Publication No. 48-4461 (1973).

Under the above-mentioned circumstances, it is strongly desired to provide a new solution polymerization method which is capable of preparing a polyamide solution usable as a spinning solution for a wet spinning process, without isolating the polyamide from the polymerization mixture. However, in order to obtain a polymer solution usable as a wet spinning solution, it is necessary to remove all or a portion of the hydrogen chloride, which is dissolved in the form of a free acid or a salt with the amide type polar solvent and which has been derived from the reaction of the diamine with the dicarboxylic acid chloride, from the polyamide solution, so that the remaining polyamide solution has a proper composition for the wet spinning process.

The known solution polymerization methods for producing the polyamide solution usable as the wet spinning solution are as follows.

(1) Japanese Patent Application Publication No. 35-14399 (1960)

Example 14 of this Publication discloses a solution polymerization method in which poly-m-phenyleneisophthalamide is produced in a relatively high concentration in a solvent consisting of dimethylacetamide; and, then, hydrogen chloride derived from the polymerization reaction is neutralized with ammonia; and, finally, the resulting precipitate comprising ammonium chloride is separated from the polyamide solution by means of filtration. In Example 14 of the publication, it is described that, since the neutralized mixture of a polyamide solution with ammonium chloride exhibited a high viscosity, it was difficult to filter the neutralized mixture. It was confirmed by the inventors of the present invention that the filtration of the polyamide solution is extremely difficult when the concentration of the polyamide is high.

Also, the publication discloses that the separation of the ammonium chloride from the polyamide solution by means of filtration becomes easy if a method is used wherein, in a first stage of the polymerization, the isophthalic acid chloride is used in an amount slightly smaller than the stoichiometric amount necessary for reacting with the entire amount of the m-phenylene diamine, and; the ammonia gas, in an amount sufficient to neutralize the resultant by-product, hydrogen chloride, is fed into the polymerization mixture. Next, in a final stage of polymerization, an additional amount of the isophthalic acid chloride is added to the polymerization mixture to complete the polymerization, and the resultant by-product, hydrogen chloride, is neutralized with calcium hydroxide. The publication states that the resultant polyamide solution is suitable as a spinning solution for both the dry and wet spinning processes.

(2) U.S. Pat. No. 3,079,219

Examples II and III of this U.S. patent disclose a two-step process for producing poly-m-phenyleneisophthalamide. In this process, a polymerization mixture, containing m-phenylene diamine and isophthaloyl chloride, is subjected to a primary polymerization procedure; the resultant primary polymerization mixture is partially neutralized with ammonia; the resultant precipitates of ammonium chloride are removed from the primary polymerization mixture by means of filtration; and, then, an additional amount of isophthaloyl chloride is added to the filtered polymerization mixture to start a secondary polymerization procedure.

However, it is known that the above-mentioned two-step process has a disadvantage in that the obtained polymer solution is opaque and turbid. This turbidity, which is derived from fine particles of ammonium chloride, cannot be removed by means of filtration. When the polymer solution is extruded through spinning nozzles, the turbidity clogs the spinning nozzles and the extruded filaments are frequently broken.

(3) U.S. Pat. No. 3,991,037

This patent discloses a two-step polymerization process for producing an aromatic polyamide. This two-step polymerization process is characterized in that, after an insoluble portion of ammonium halide is separated from a pre-condensation mixture but prior to a post-condensation procedure, an inorganic base, such as calcium oxide or calcium hydroxide, is added to the separated pre-condensation mixture in order to release ammonia from the ammonium halide remaining in the pre-condensation mixture.

However, the above-mentioned two-step process is disadvantageous in the following ways.

(1) It is necessary to remove the ammonia and water generated by the reaction of the inorganic base with the ammonium halide.

(2) When the above-mentioned ammonia and water are eliminated from the condensation mixture by means of evaporation under reduced pressure, a portion of the solvent in the condensation mixture is also evaporated. This phenomenon causes the concentration of the prepolymer in the condensation mixture to be undesirably altered.

(3) If the ammonia and water are incompletely eliminated, the degree of polymerization of the post condensation product is unsatisfactorily low.

SUMMARY OF THE INVENTION

An object of the present invention is to provide a process for preparing a cyclic amide polymer-amide type polar solvent composition suitable for producing shaped articles.

Another object of the present invention is to provide a process for preparing a cyclic amide polymer-amide type polar solvent composition having a satisfactory spinning property.

The above-mentioned objects can be attained by the process of the present invention which comprises the steps of:

(A) prepolymerizing, in an amide type polar solvent, at least one cyclic diamine selected from the group consisting of aromatic diamines and heterocyclic diamines, which are neither ortho nor peri oriented, with at least one cyclic dicarboxylic acid chloride selected from the group consisting of aromatic dicarboxylic acid chlorides and heterocyclic dicarboxylic acid chlorides which are neither ortho nor peri oriented, in a molar equivalent less than that of the cyclic diamine, to prepare a prepolymer solution containing a by-product consisting of hydrogen chloride;

(B) removing at least a portion of the hydrochloric acid from said prepolymer solution by first neutralizing it with ammonia, and then, by separating the resultant precipitate comprising ammonium chloride from the prepolymer solution by means of filtration, to prepare a prepolymer filtrate;

(C) high polymerizing the prepolymer in said prepolymer filtrate with an additional amount of at least one cyclic dicarboxylic acid chloride selected from the group consisting of aromatic and heterocyclic dicarboxylic acid chlorides to prepare a polyamide solution containing a by-product consisting of hydrogen chloride, and;

(D) converting the entire amount of the hydrogen chloride in the polymer solution to salt which is soluble in the amide type polar solvent and capable of enhancing the solubility of said polyamide in said amide type polar solvent, with a neutralizing agent, to provide a polyamide composition, and which process is characterized in that:

(a) in said prepolymerization step (A), the resultant prepolymer solution exhibits a solution viscosity of 20 poise or less at a temperature of 50° C.;

(b) in said removing step (B), said first neutralizing procedure of said prepolymer solution with ammonia is carried out to such an extent that a mixture of 10 g of the resultant neutralized mixture with 200 ml of ion-exchanged water exhibits a pH of from 3.7 to 8.0, and;

(c) in said conversion step (D), 10 to 70% of $NH_4Cl$ contained in said polyamide solution is also converted with said neutralizing agent into said amide type polar solvent-soluble salt, and the entire amount of said amide type polar solvent-soluble salt corresponds to from 5 to 95% by weight of the theoretical amount of said amide-type polar solvent-soluble salt to be derived from the entire amount of said cyclic dicarboxylic acid chloride used in said prepolymerization step (A) and said polymerization step (C).

The cyclic amide polymer-amide type polar splvent composition of the present invention is useful for producing shaped articles, such as fibers, fibrids, tapes and films, by a wet shaping process or a dry jet-wet shaping process. In the above-mentioned shaping processes, a shaped stream or streams of the composition of the present invention may be coagulated in a coagulating bath containing calcium chloride. In the coagulating operation, it is preferable that the concentration of calcium chloride in the coagulating bath be 30% by weight or more, or 20% by weight or less.

DETAILED DESCRIPTION OF THE INVENTION

Prepolymerization step (A)

In the prepolymerization (A), a prepolymer solution is prepared by prepolymerizing, in an amide type polar solvent, at least one cyclic diamine selected from the group consisting of aromatic diamines and heterocyclic diamines which are neither ortho nor peri oriented, with at least one cyclic dicarboxylic acid chloride selected from the group consisting of aromatic dicarboxylic acid chlorides and heterocyclic dicarboxylic acid chlorides which are neither ortho nor peri oriented, the cyclic dicarboxylic acid chloride being in a molar equivalent less than that of the cyclic diamine. The resultant prepolymer solution contains hydrogen chloride as a by-product.

The cyclic diamine usable for the process of the present invention may be selected from the group consisting of the compounds of the formulae (I) and (II):

$$R_1HN—Ar_1—NHR_2 \quad\quad (I)$$

and $$R_3HN—Ar_2—Y—Ar_3—NHR_4 \quad\quad (II)$$

wherein Ar$_1$, Ar$_2$ and Ar$_3$ respectively represent, independently from each other, a member selected from the group consisting of divalent aromatic radicals and divalent heterocyclic radicals, each substituted or unsubstituted with at least one substituent not reactive to a carboxylic acid chloride radical; Y represents a bond selected from the group consisting of —O—, —S—, —CO—, —SO—, —SO$_2$—, —CH$_2$—, —CONH—, N-substituted imino and alkylidene radicals; and R$_1$, R$_2$, R$_3$ and R$_4$ respectively represent, independently from each other, a member selected from the group consisting of a hydrogen atom and alkyl radicals having 1 to 20 carbon atoms, preferably, 1 to 4 carbon atoms, more preferably, 1 or 2 carbon atoms. With respect to the cyclic diamines of the formulae (I) and (II), the valence bonds of the radicals Ar$_1$, Ar$_2$ and Ar$_3$ are not ortho and peri oriented; in other words, are not extended from carbon atoms neighbouring each other or in the peri position.

The divalent aromatic radicals may be a single aromatic ring or two or more aromatic rings that are the same as or different from each other, and that are condensed together or are linked together by a single bond or by a bridging atom or radical. That is, the divalent substituted or unsubstituted aromatic radicals may be selected from divalent benzene, naphthalene, anthracene and phenanthrene rings, bephenyl and terphenyl radicals, and a divalent phenyl-naphthalene radical.

The substituent, not reactive to the carboxylic acid chloride radical, is selected from the group consisting of halogen atoms and lower alkyl, phenyl, acyl, carboalkoxy, acyloxy, alkoxy, nitro, dialkylamino, thioalkyl, carboxyl and sulfonic acid radicals.

Usually, the aromatic diamine is selected from the group consisting of m-phenylene diamine, toluylene diamine, chloro-phenylene diamines, bromophenylene diamines, methyl-phenylene diamines, acetylphenylene diamines, amino-anisidines, benzidine, 1,5-naphthylene diamine, bis(aminophenyl)ethers, bis(aminophenyl)ketones, bis(aminophenyl)phenylamines and bis(aminophenyl)methane. When it is desired to obtain a polyamide having a high solubility in the solvent, it is preferable to use two or more different cyclic diamines. However, when it is desired to obtain a polyamide having an excellent crystallinity from the two or more cyclic diamines, it is preferable that one of the cyclic diamines be used in an amount of 90 molar % or more.

The cyclic dicarboxylic acid chloride usable for the process of the present invention may be selected from the group consisting of the compound of the formulae (III) and (IV):

$$ClCO—Ar_4—COCl \quad\quad (III)$$

and $$ClCO—Ar_5—Y—Ar_6—COCl \quad\quad (IV)$$

wherein Ar$_4$, Ar$_5$ and Ar$_6$ respectively represent, independently from each other, a member selected from the group consisting of divalent aromatic radicals and divalent heterocyclic radicals, each substituted or unsubstituted with at least one substituent not reactive to an amino radical; and Y represents a bond selected from the group consisting of —O—, —S—, —CO—, —SO—, —SO$_2$—, —CH$_2$—, —CONH—, N-substituted imino and alkylidene radicals.

Regarding the cyclic dicarboxylic acid chlorides of the formulae (III) and (IV), the two valence bonds are not ortho and peri oriented. In other words, the valence bonds are not connected to carbon atoms neighbouring each other and are not peri positioned.

The divalent aromatic radical may be a single aromatic ring or two or more aromatic rings that are the same as or different from each other, and that are condensed together or are linked together by a single bond or by a bridging atom or radical.

The substituent, not reactive to the amino radical, is selected from the group consisting of halogen atoms and lower alkyl, phenyl, acyl, carboalkoxy, acyloxy, alkoxy, nitro, phenoxy, and thioalkyl radicals.

The cyclic dicarboxylic acid chloride is usually selected from substituted and unsubstituted aromatic dicarboxylic acid chlorides which include isophthalic acid chloride, 3-chloroisophthalic acid chloride and 3-methoxyisophthalic acid chloride.

When it is desired to produce a polyamide having an excellent solubility in the solvent, it is preferable to use two or more different cyclic dicarboxylic acid chlorides. However, when it is desired to obtain a polyamide having a high degree of crystallinity, it is preferable that one of the two or more cyclic dicarboxylic acid chlorides be used in an amount of at least 90 molar %.

In the process of the present invention, it is possible to use various combinations of the various cyclic diamines with various dicarboxylic acid chlorides, to produce various types of cyclic amide homopolymers, copolymers and block copolymers which are useful for various purposes.

In the prepolymerization (A) of the process of the present invention, it is preferable to use combinations of m-phenylene diamine with isophthalic acid chloride.

The prepolymerization system may contain, as a co-monomer to be copolymerized with the cyclic diamine and dicarboxylic acid chloride components, at least one cyclic aminocarboxylic acid hydrogen halide of the formula (V):

Hydrogen halide . R₅HN—Ar₇—COCl    (V)

wherein $Ar_7$ represents a member selected from the group consisting of divalent aromatic radicals and divalent heterocyclic radicals, each substituted or unsubstituted with at least one substituent not reactive to a carboxylic acid chloride radical and an amino radical; and $R_5$ represents a member selected from the group consisting of a hydrogen atom and alkyl radicals having 1 to 20 carbon atoms.

In the cyclic compound of the formula (V), the valence bonds of the radical $Ar_7$ are not ortho and peri oriented. The divalent aromatic radical may be selected from the group consisting of a single aromatic ring and two or more aromatic rings that are the same as or different from each other, and that are condensed together or are linked together by a single bond or by a bridging atom or radical. The substituent not reactive to the carboxylic acid chloride radical, and the amino radical, is selected from the group consisting of halogen atoms and lower alkyl, phenyl, acyl, carboalkoxy, acyloxy, alkoxy, nitro, and, thioalkyl radicals.

The comonomer of the formula (V) should be used in an amount which does not cause the desired properties of the resultant prepolymer solution to be deteriorated.

The above-mentioned comonomer of formula (V) may be used in a desired amount in the polymerization (C) which will be illustrated in detail hereinafter. The comonomer of the formula (V) may include m-aminobenzoyl chloride hydrochloric acid.

The solvent usable for the process of the present invention is an amide type polar solvent, which consists of at least one compound selected from, for example, the group consisting of tetramethyl urea, N,N-dimethylacetamide, N-methyl-2-pyrrolidone, N-methyl-2-piperidone, N,N-dimethylethylene urea, N,N,N',N'-tetramethyl maleic amide, N-methylcaprolactam, N-acetylpyrrolidine, N,N-diethylacetamide, N-ethyl-2-pyrrolidone, N,N-dimethylpropionic amide, N,N-dimethylisobutylamide, and N,N-dimethylpropyl urea.

It is preferable that the polar solvent consists of at least one member selected from N-methyl-2-pyrrolidone (NMP) and N,N-dimethylacetamide (DMAC).

Also, it is preferable that the amide type polar solvent is substantially free from other substances, for example, water, which adversely effect the prepolymerization (A) of the polymerization (C) in the process of the present invention.

In the prepolymerization (A), an additive, which is effective for enhancing the stability of the resultant prepolymer solution, may be added to the prepolymerization system before, during or after the prepolymerization. The additive may contain one or more inorganic compounds which are soluble in the polar solvent, for example, lithium chloride, calcium chloride and magnesium chloride. Usually, the prepolymerization operation is carried out in the following manner.

The cyclic diamine component is dissolved in the amide type organic polar solvent, and the cyclic dicarboxylic acid chloride component, in the form of a powder or melt, is added to the cyclic diamine solution while vigorously stirring the mixture. The prepolymerization is preferably carried out at a temperature of from −20° to 100° C., more preferably, from −15° to 60° C.

In the prepolymerization step A, the molar ratio of the cyclic diamine component to the cyclic dicarboxylic acid chloride is an important factor in obtaining a prepolymer solution having a desired solution viscosity which does not exceed 20 poises at a temperature of 50° C. The solution viscosity of the resultant prepolymer solution is variable depending on not only the concentration of the cyclic diamine component in the prepolymerization system, but also, the molar ratio of the cyclic diamine component to the cyclic dicarboxylic acid chloride. Therefore, in order to obtain a prepolymer solution having a solution viscosity of 20 poises or less, the proper concentrations and types of the cyclic diamine and dicarboxylic acid chloride component and the proper amount and type of the polar solvent, the proper type and amount of the additive, and the proper molar ratio of the cyclic diamine component to the cyclic dicarboxylic acid chloride component should be previously known by a preliminary experiment.

In the process of the present invention, it is essential that the prepolymer solution exhibit a solution viscosity of 20 poises or less, preferably, 10 poises or less, at a temperature of 50° C.

Figure 1:
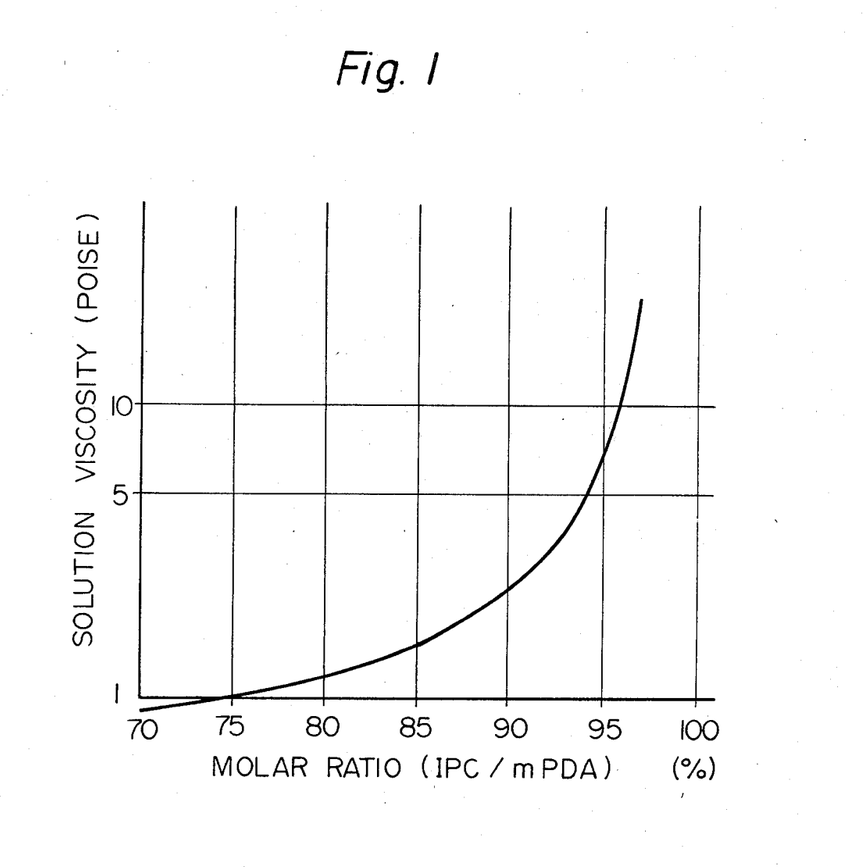
FIG. 1 is a graph showing the relationship between the molar ratio of isophthalic acid chloride (IPC) to m-phenylene diamine (m PDA) to be prepolymerized in a solvent consisting of N-methyl-2-pyrrolidone (NMP), and the solution viscosity of the resultant prepolymer.

The accompanying drawing is a graph showing the relationship of the molar ratio of isophtharic acid chloride (IPC) to m-phenylene diamine (m PDA) to be prepolymerized in NMP to a solution viscosity of the resultant prepolymer. In this case, the m PDA was used in a concentration of 1.33 moles/l. The drawing shows that, in order to obtain a prepolymer solution having a solution viscosity as small as possible, it is preferable that the above-mentioned molar ratio be 95% or less, more preferably, 90% or less.

Removal (B) of hydrochloric acid from prepolymer solution

The prepolymer solution contains a cyclic amide prepolymer and a by-product consisting of hydrochloric acid. In the removing step (C), either the entire amount or a portion of the hydrochloric acid is first neutralized with ammonia to cause the resultant ammonium chloride ($NH_4Cl$) to be precipitated from the prepolymer solution.

The ammonia to be introduced into the prepolymer solution may be in the state of a gas, liquid or a solution thereof dissolved in the amide type polar solution under atmospheric pressure or an increased pressure.

The first neutralization temperation is variable depending on the types of the cyclic diamine and dicarboxylic acid chloride used, the concentration of the resultant prepolymer, the state of the ammonia and the desired neutralization rate. However, the first neutralization is usually carried out at a temperature of from 0° to 100° C. When it is desired to carry out the neutralization rapidly by using liquid ammonia, it is preferable that, in the initial stage of the neutralization operation, the neutralization temperature be relatively low, for example, in a range of from 0° to 60° C. When ammonia in the state of a gas is used, it is preferable to carry out the neutralization at a relatively high temperature of from 20° to 90° C., more preferably, from 30° to 80° C., in order to decrease the solution viscosity of the prepolymer solution and accelerate the reaction rate of the ammonia gas with the hydrochloric acid. The neutralization of the hydrochloric acid with ammonia results in precipitation of ammonium chloride, because the ammonium chloride exhibits an extremely small solubility in the amide type polar solvent. The resultant precipitate is separated from the prepolymer solution by means of filtration. Accordingly, it is important that the prepolymer solution exhibit a porpoer solution viscosity for filtration and the precipitated solid particles of the ammonium chloride exhibit a proper size for filtration.

The filtration can be carried out by using any conventional filtering materials, for example, particulate filtering materials, such as a sand filter; shaped filtering materials such as ceramic filters and sintered metal filters; filtering woven and non-woven fabrics made from, for example, cotton, glass fibers, polyester fibers, and; filtering paper. Needless to say, the filtering material must be non-reactive to the prepolymer solution.

The resultant ammonium chloride cake contains therein a considerable amount of the prepolymer. Accordingly, it is preferable to recover the prepolymer from the cake by extracting it with the amide type polar solvent and recycle the recovered prepolymer into the prepolymerization step.

The prepolymer filtrate prepared in the removing step (B) is extremely stable during a long period of storage unless the prepolymer filtrate is exposed to an elevated temperature and/or humidity which cause the prepolymer to deteriorate.

When the prepolymer filtrate exhibits a high concentration of the prepolymer, the prepolymer filtrate may sometimes be coagulated at a low temperature. In this case, the coagulated prepolymer filtrate can usually be easily liquidized by being heated to an elevated temperature. However, if it is very difficult or impossible to liquidize the coagulated prepolymer filtrate, the temperature of the prepolymer filtrate should be maintained at a level sufficient to keep the prepolymer filtrate in the state of a liquid, or an additive effective for enhancing the solubility of the prepolymer in the solvent should be added to the prepolymer filtrate.

In the removing step (B), the first neutralizing procedure of the prepolymer solution, by using ammonia, is carried out to such an extent that a mixture of 10 g of the resultant neutralized mixture with 200 ml of ion-exchanged water exhibits a pH of from 3.7 to 8.0.

If the pH of the mixture exceeds 8.0, the concentration of ammonia in the prepolymer solution becomes large and the degree of polymerization of the polyamide obtained in the high polymerization step (C) is unsatisfactorily poor. Also, if the pH of the mixture is less than 3.7, the concentrations of hydrogen chloride and NH$_4$Cl become undesirably large and the resulting spinning solution in the converting step (D) exhibits an unsatisfactory filtering property.

High polymerization (C)

A polyamide solution containing the cyclic amide polymer with a high degree of polymerization can be produced by polymerizing the prepolymer with an additional amount of cyclic dicarboxylic acid chloride. In the high polymerization step (C), an additional amount of the cyclic dicarboxylic acid chloride, which is in the state of a powder, a melt, a solution or a slurry, is added to the prepolymer filtrate. The solution or slurry of the cyclic dicarboxylic acid chloride is prepared by using an organic solvent, which is not reactive to the carboxylic acid chloride radical (chloroformyl radical, —COCl), for example, n-hexane, benzene, cyclohexane, methylene chloride, chloroform, tetrahydrofuran, or methylethyl ketone. The addition of the cyclic dicarboxylic acid chloride is usually carried out while stirring the mixture so as to promote the high polymerization reaction.

It is preferable that the high polymerization (C) be carried out at a temperature of from −20° to 100° C., more preferably, from 0° to 90° C., still more preferably, from 10° to 80° C. The proper high polymerization temperature to be applied to the high polymerization step (C) has to be selected in consideration of the heat produced by the reaction of the cyclic dicarboxylic acid chloride with the prepolymer, the solubility of the resultant polymer in the solvent and the temperature at which the resultant polyamide solution is coagulated.

The degree of polymerization of the resultant polyamide is variable depending on not only the polymerization temperature and time, and the intensity of the stirring operation, but also the proportion in weight or volume of the added cyclic dicarboxylic acid chloride to the prepolymer filtrate. The proper proportion for obtaining a desired degree of polymerization can be found by measuring the amount of the amino group in the prepolymer.

The degree of polymerization necessary for the polyamide is variable depending on the purpose of the resultant polyamide. The degree of polymerization of the polyamide can be controlled by various conventional methods, for example, by using a polymerization terminator. The polymerization terminator usable for the process of the present invention may comprise at least one compound selected from the group consisting of ammonia and compounds of the formula (X):

$$Z_1\text{—}R\text{—}(Z_2)_n \qquad (X)$$

wherein R represents a hydrocarbon radical having 2 or 3 valence bonds; $Z_1$ represents a radical selected from the group consisting of radicals of the formula —NHR$_{13}$ in which R$_{13}$ represents a member selected from a hydrogen atom and lower alkyl radicals —OH, —COX$_1$ wherein X$_1$ represents a halogen atom, —NCO, —SO$_2$X$_2$ in which X$_2$ represents a halogen atoms, —CHO, —NCS, —SH and —CONHNH$_2$; $Z_2$ represents a member selected from the group consisting of a hydrogen atom, halogen atoms, nitro radicals, alkoxy radicals and lower alkyl radicals having 1 to 10 carbon atoms; $Z_1$ and $Z_2$ may be bonded to each other to form a carboxylic anhydride group of the formula and; n represents an integer of 1 or 2. The compound of the formula (X) is selected from the group consisting of aniline, toluidine, N-methylaniline, N-methyltoluidine, benzoic acid chloride, benzene sulfonic acid chloride, phenylisocyanate, p-nitrophynol, benzaldehyde, nitrophthalic anhydride and nitrosuccinic anhydride.

Preferable compounds for the polymerization terminator are aniline, toluidine and benzoic acid chloride. The polymerization terminator is preferably used in an amount of from 0.01 to 1.0 molar % based on the amount of said aromatic diamine component in the high polymerization system. When the polymerization terminator is added to the prepolymer filtrate before the start of the high polymerization, the amount of the polymerization terminator is preferably in a range of from 0.1 to 0.7 molar %. When the polymerization terminator is added to the high polymerization system after the start of the high polymerization, the amount of the polymerization terminator is variable depending on the period of time between the start of the high polymerization and the addition of the polymerization terminator. The longer the period of time, the larger the amount of the polymerization terminator to be added to the high polymerization system. Usually, it is preferable that the polymerization terminator be added to the high polymerization system within 30 minutes, more preferably, 15 minutes, from the start of the high polymerization. Also, usually, when the high polymerization is terminated with the polymerization terminator, the shaped articles produced from the resultant polymer composition exhibit a higher heat resistance than that of shaped articles produced from a polymer composition which have been prepared by not terminating the high polymerization.

Generally, the cyclic dicarboxylic acid chloride used in the high polymerization step (C) is the same as that used in the prepolymerization step (A). However, in accordance with the purpose of the resultant polyamide, the cyclic dicarboxylic acid chloride used in the polymerization step (C) may be different from that used in the prepolymerization step (A).

The high polymerization step (C) may be carried out in such a manner that a mixture of two or more different prepolymer filtrates or a mixture of a prepolymer filtrate and a cyclic diamine is prepared, and one or more cyclic dicarboxylic acid chlorides are added to the above-mentioned mixture. In this case, the resultant polymer is a block copolymer or a copolymer having a blocking structure. Some of the above-mentioned copolymers can be converted into shaped articles having an excellent mechanical strength and/or an excellent Young's modulus, or other special property.

Usually, the polyamide produced by the process of the present invention exhibits a degree of polymerization higher than that produced by the conventional process in which the polymerization is carried out in one single step.

The high polymerization system may contain at least one aromatic aminocarboxylic acid hydrogen halide of the formula (V). The compound of the formula (V) used in the high polymerization step (C) may be the same as or different from that used in the prepolymerization step (A).

Converting step (D) of hydrochloric acid to a solvent-soluble salt

The polyamide solution obtained in the high polymerization step (C) contains, in addition to the resultant polyamide and the amide type organic polar solvent, hydrogen chloride which has been produced as a by-product in the high polymerization step (C) and NH$_4$Cl which has been derived from the prepolymer solution.

In the converting step (D), a sperific amount, that is, 10 to 70%, of NH$_4$Cl contained in the polyamide solution and the entire amount of hydrogen chloride are neutralized to provide a polyamide composition having an excellent shaped article-forming property.

When Ca(OH)$_2$ is used as a neutralizing agent, the neutralizing reactions which occurred are as follows.

$$2HCl + Ca(OH)_2 \rightarrow CaCl_2 + 2H_2O$$

and $$2NH_4Cl + Ca(OH)_2 \rightarrow CaCl_2 + 2NH_4 + H_2O$$

In the above-mentioned reactions, HCl is derived from the high polymerization step and NH$_4$Cl remains in the prepolymer solution after the removing step (B). In the converting step (D), first, the neutralization of HCl occurs and, then the neutralization of NH$_4$Cl occurs. NH$_4$Cl and Ca(OH)$_2$ are insoluble in the polyamide composition. Accordingly, in order to provide a neutralized polyamide composition having a satisfactory filtering property, it is important to make the sum of the amounts of residual NH$_4$Cl and Ca(OH) in the polyamide composition as small as possible.

Therefore, in the process of the present invention, in order to obtain a clear polyamide composition useful for producing shaped articles, it is important that the entire amount of HCl and 10 to 70% of NH$_4$Cl contained in the polyamide solution are converted into a compound which is soluble in the amide type polar solvent.

When the conversion of NH$_4$Cl in the converting step (D) is either less than 10% or more than 70%, the resultant polyamide composition exhibits an unsatisfactory filtering property.

The neutralizing agent comprises at least one compound selected from the group consisting of oxides, hydroxides, hydrogenated compounds and carbonates of metals of Groups I and II in the Periodic Table.

The salts produced from the hydrochloric acid and the neutralizing agent can be dissolved in the polar solvent and can enhance the solubility of the resultant polyamide in the polar solvent. This type of salt is a so-called solubilizing auxiliary agent. Some types of neutralizing agents cause water to be produced together with the salt. However, the water does not deteriorate the quality of the resultant cyclic amide polymer composition. The amount of water in the resultant composition can be controlled by any conventional method.

The neutralizing agent usable for the present invention may be selected from lithium carbonate, lithium oxide, lithium hydroxide, lithium hydroxide monohydrate, hydrogenated lithium, calcium oxide, magnesium oxide, magnesium hydroxide, and magnesium carbonate. From the point of view of practical use, the oxides and hydroxides of calcium and magnesium are preferable neutralizing agents for the present invention. The most preferable neutralizing agents are calcium oxide and calcium hydroxide. The above-mentioned inorganic neutralizing agents are more desirable than organic neutralizing agents, such as tertiary amines, from the point of view of preventing environmental pollution.

The temperature of the converting step (D) is variable depending on the chemical structure and concentration of the resultant polyamide, type of the solvent, type of neutralizing agent, type of resultant salt, and the amount of hydrochloric acid to be converted. Usually, the converting operation is carried out at a temperature of from 0° to 150° C. The temperature may be changed in accordance with the progress of the converting operation.

In the converting step (D), it is preferable that the reaction mixture be stirred or kneaded so that the neutralizing reaction is uniformly effected. The degree of the neutralization is variable depending on the purpose of the resultant composition, the stability of the composition and change in degree of polymerization of the polyamide during the converting step (D). When the reaction vessel used is one that is corroded by the hydrochloric acid in the reaction mixture, it is preferable that all of the hydrochloric acid be neutralized.

The cyclic amide polymer composition produced in accordance with the process of the present invention exhibits a solution viscosity remarkably smaller than that of a composition which has been produced by such a conventional process that a cyclic diamine is polymerized with a cyclic dicarboxylic acid chloride in the same molar equivalent as that of the cyclic diamine, in one single step, and all of the hydrochloric acid produced from the polymerization reaction is neutralized in one single operation, and which has the same concentration of the polyamide as that of the composition of the present invention. In the above-mentioned conventional process, the resultant composition comprises the amide type polar solvent-soluble salt (solubilizing auxiliary agent), such as calcium chloride ($CaCl_2$), in a larger amount than that produced by the process of the present invention. This large content of the salt causes the solution viscosity of the resultant composition to be undesirably large.

In the converting step (D), it is essential that 10 to 70% of the $NH_4Cl$ contained in the polyamide solution is also converted into the amide type polar solvent-soluble salt in an amount corresponding to from 5 to 95% by weight of the theoretical amount of the amide type polar solvent-soluble salt to be derived from the entire amount of the cyclic dicarboxylic acid chloride used in the prepolymerization step (A) and the polymerization step (C). When the amount of the polar solvent-soluble salt is in the above-mentioned range, the solution viscosity of the composition is relatively low. However, when the amount of the polar solvent-soluble salt is smaller than 5% by weight, the resultant composition exhibits a poor stability and easily gelatinizes. That is, it is difficult to store the composition for a long period of time without gelatinizing. When the amount of the polar solvent-soluble salt is larger than 95% by weight of the above-mentioned imaginary amount, the resultant composition exhibits a remarkably increased solution viscosity.

The effects of the polar solvent-soluble salt (solubilizing auxiliary agent) on the composition of the present invention are as follows.

(1) The polyamide is prevented from being deposited and the composition is gelatinized. That is, the solution stability of the composition is enhanced.

(2) The solution solubility of the composition is increased. Therefore, a content of salt larger than 95% causes the resultant composition to exhibit a solution viscosity that is too large and a poor shaping property.

(3) A content of salt within the above-specified range is effective for enhancing the shaping property and the coagulating property of the resultant composition. However, a content of the salt larger than 95% results in a poor coagulating property of the resultant composition.

The desirable amount of the polar solvent-soluble salt (solubilizing auxiliary agent) in the composition is variable depending on the molecular structure of the polyamide in the composition.

When the polyamide is a poly-m-phenyleneisophthalamide type polyamide, it is preferable that the amount of the polar solvent-soluble salt produced in the conversion step (D) correspond to 5 to 90%, more preferably, 5 to 80% by weight, still more preferably, 5 to 40%, of the above-mentioned imaginary amount of the polar solvent-soluble salt. For example, when a solution of a poly-m-phenyleneisophthalamide in an amid type polar solvent, which solution contains the polar solvent-soluble salt in too large an amount, is subjected to a conventional wet spinning process wherein an aqueous solution of calcium chloride is used as a coagulating liquid, the resultant fibers exhibit a poor transparency and mechanical strength due to a number of voids created on the peripheral surfaces and the inside of the fibers. The process of the present invention is preferably applied to the production of compositions containing poly-m-phenyleneisophthalamide type polyamides. The term "poly-m-phenyleneisophthalamide type polyamide" used herein refers to a polyamide containing 85 molar % or more of at least one repeating unit selected from the group consisting of those of the formulae (VI) and (VII):

$$-NR_7-Ar_9-NR_8CO-Ar_{10}-CO- \qquad (VI)$$

and $$-NR_9-Ar_{11}-CO- \qquad (VII)$$

wherein $Ar_9$, $Ar_{10}$ and $Ar_{11}$ respectively represent, independently from each other, a divatent aromatic radical substituted or unsubstituted with at least one substituent, the valence bonds of the aromatic radicals, which radicals are in an amount corresponding to at least 30 molar % of the entire aromatic radicals, being neither ortho nor peri oriented; $R_7$, $R_8$ and $R_9$ respectively represent a member selected from the group consisting of a hydrogen atom and alkyl radicals having 1 to 10 carbon atoms.

In the formulae (VI) and (VII), $Ar_9$, $Ar_{10}$ and $Ar_{11}$ may be respectively selected, independently from each other, from the group consisting of 1,3-phenylene, 3,3'-biphenylene, 3,4'-biphenylene, 1,3-naphthylene, 1,6-naphthylene radicals and radicals of the formulae:

and wherein X represents a bond selected from the group consisting of —O—, —$CH_2$—, —S— and —CO—.

The above-mentioned aromatic rings may be unsubstituted or substituted with at least one substituent, selected from for example, halogen atoms, alkyl, phenyl, acyl, carboalkoxy, alcokoxy, nitro and thioalkyl radicals.

In the formulae (VI) and (VII), $R_7$, $R_8$ and $R_9$ may respectively be a hydrogen atom or a methyl, ethyl or propyl radical.

The poly-m-phenyleneisophthalamide type polyamides, which exhibit an excellent heat resistance and flame resistance, may include poly-m-phenyleneisophthalamide; a copolymer containing as an essential moiety, poly-m-phenyleneisophthalamide, for example, poly-m-phenylene-isophthalamideterephthalamide copolymers and poly-m-phenylene-p-phenyleneisophthalamide copolymers; poly(4-methyl-1,3-phenylene)isophthalamide; poly(2-methyl-1,3-phenylene)-(4-mehtyl-1,3-phenylene)isophthalamide copolymers; poly-m-phenyleneterephthalamide and poly-p-phenyleneisophthalamide.

The poly-m-phenyleneisophthalamide type polyamides are relatively highly soluble in the amide type polar solvents, especially those containing the polar solvent-soluble salt (solubilizing auxiliary agent), and are capable of forming a shaping solution (dope) having a relatively high concentration of the polymer, incomparison with those of other types of the cyclic polyamides. However, generally, this type of polyamides exhibit a relatively poor coagulating property in the conventional wet shaping process, in comparison with that of the p-oriented type cyclic amide polymers. Accordingly, in the conversion step (D) in the process of the preparation of the poly-m-phenyleneisophthalamide type polyamide composition, it is preferable that the polar solvent-soluble salt (solubilizing auxiliary agent) be produced in an amount corresponding to 5 to 90%, more preferably, 5 to 80%, by weight, of the above-specified imaginary amount of the polar solvent-soluble salt.

The concentration of the cyclic amide polymer in the resultant composition of the present invention can be controlled not only by the amounts of the cyclic diamine and dicarboxylic acid chloride components fed to the prepolymerization step (A), but also, by the amount of the prepolymer and the additional amount of the cyclic dicarboxylic acid chloride fed to the high polymerization step (C). Usually, the concentration of the cyclic amide polymer in the composition is variable depending on the type of shaped articles to be produced from the composition, the purpose of the shaped articles and the type of process for shaping the composition.

When a composition is used to produce fibrids, it is preferable that the concentration of the cyclic amide polymer in the composition be relatively small in comparison with that in the composition to be used to produce fibers or films. Also, when fibers are produced from a cyclic amide polymer composition by a dry jet-wet spinning process, the concentration of the polymer in the composition may be relatively high in comparison with that to be used in a wet spinning process.

The concentration of the polar solvent-soluble salt (solubilizing auxiliary agent) in the composition can be controlled not only by the molar ratio of the cyclic diamine to the cyclic dicarboxylic acid chloride used in the prepolymerization step (A), but also, by the type and the additional amount of the cyclic dicarboxylic acid chloride and the amount of the polymerization terminating agent used in the high polymerization step (C).

The cyclic amide polymer composition produced by the process of the present invention can be used to produce not only fibers, films, tapes and fibrids which are useful as industrial fiber materials, insulating materials, laminate materials, reinforcing materials and paper-like artificial sheets, but also, various liquid materials, for example, coating liquids and adhesive liquids.

SHAPING OF THE CYCLIC AMIDE POLYMER COMPOSITION

The cyclic amide polymer composition produced in accordance with the present invention is useful as a shaping solution for a wet or dry jet-wet shaping process. In the shaping processes, a shaped steam or streams of the shaping solution can be coagulated in a coagulating bath consisting of an aqueous solution containing calcium chloride. In this case, it is necessary that the coagulating bath be able to dissolve the amide type polar solvent in the shaping solution, but not be able to dissolve the polymer in the shaping solution.

The term "an aqueous solution containing calcium chloride" used herein refers to an aqueous solution containing calcium chloride alone or a mixture of the calcium chloride, as a main component, and a small amount of additional salt, for example, chlorides and sulfonates of lithium, magnesium, aluminium and zinc. The aqueous solution may contain a small amount of the same solvent as that in the shaping solution.

In the shaping operation for the polymer composition of the present invention, it is preferable that the calcium chloride in the coagulating bath be in a concentration of 30% by weight or more or 20% by weight or less.

A coagulating bath containing calcium chloride in a concentration of more than 20% but less than 30% by weight is usable for coagulating the shaping solution of the present invention. However, this type of coagulating bath sometimes causes the recovery of the amide type polar solvent from the coagulating bath to be difficult and the quality of the recovered solvent to be poor.

Usually, the recovery of the amide type polar solvent from the coagulating bath discharged from the coagulating process is carried out by extracting the solvent with a liquid halogenated hydrocarbon, for example, methylene chloride and ethylene chloride. In the extracting operation, it is preferable that the liquid halogenated hydrocarbon layer containing the extracted solvent be definitely separated from the liquid layer of the remaining coagulating bath. The specific gravity of the halogenated hydrocarbon is in a range of from 1.2 to 1.4. Therefore, it is preferable that the specific gravity of the coagulating bath be less than 1.2 or more than 1.4. That is, it is preferable that the coagulating bath contain calcium chloride in a concentration of 20% or less, which causes the specific gravity of the resultant coagulating bath to be less than 1.2, or 30% or more, which causes the specific gravity to be more than 1.4.

The concentrations of calcium chloride and the amide type polar solvent in the coagulating bath are determined in accordance with the following equations.

$$\text{Concentration of CaCl}_2 \, (\%) = \frac{\text{Weight of CaCl}_2}{\text{Sum of weights of CaCl}_2 \text{ and water}} \times 100$$

$$\text{Concentration of Solvent} \, (\%) = \frac{\text{Weight of solvent}}{\text{Sum of weight of CaCl}_2 \text{ and water}} \times 100$$

The temperature of the coagulating bath is maintained at a level lower than the boiling point thereof. The concentration of calcium chloride in the coagulating bath is lower than a saturated concentration thereof.

In the coagulating process for the shaping solution of the present invention, the coagulating operation with the above-specified coagulating bath may be followed by one or more additional coagulating operations with a water bath or an aqueous solution bath containing the above-mentioned salt and/or the amide type polar solvent at a temperature of from 0° to 100° C., and if necessary, by a drawing operation, heat-treating operation and/or heat-drawing operation. The heat-treating operation and the heat-drawing operations are effective for enhancing the mechanical strength and modulus of the resultant shaped articles, for example, fibers and films.

The shaped articles produced by the above-described spinning process exhibit proper mechanical properties and thermal properties, and no devitrification.

The following specific examples are presented for the purpose of clarifying the present invention. However, it should be understood that these are intended only to be examples of the present invention and are not intended to limit the scope of present invention in any way.

In the examples, the intrinsic viscosity ($\eta$ inh) of the polymer was a logarithmic viscosity number determined in a solution of 0.5 g of the polymer in 100 ml of a concentrated sulfuric acid at a temperature of 30° C.

EXAMPLE 1

A solution was prepared by dissolving 857.4 g of m-phenylene diamine (mPDA) in 5.95 Kg of N-methyl-pyrrolidone-2(NMP) which had been dehydrated with moelcular sieves and, then, cooled to a temperature of −4° C. A prepolymerization was carried out by adding 1094.0 g of isophthalic acid chloride (IPC) to the mPDA solution, at a temperature of from 20° to 60° C., for 10 minutes. The molar ratio of IPC to mPDA was 68%.

Next, ammonia gas was blown into the resultnat prepolymer solution at a temperature of 40° C. to 60° C., to neutralize the prepolymer solution to such an extent that a mixture of 10 g of the resultant neutralized mixture with 200 ml of ion-exchanged water exhibits a pH of 5.5. The resultant precipirate consisting of $NH_4Cl$ was separated from the prepolymer solution by means of filtration. The filtration was smoothly carried out without difficulty. The resultnat prepolymer filtrate was clear and exhibited a solution viscosity not exceeding 1 poise. The amount of $NH_4Cl$ contained in the clear prepolymer filtrate was 0.65% by weight.

A high polymerization was carried out by adding 414.2 g of IPC to 6085 g of the prepolymer filtrate which had been mixed with 1.38 g of aniline, at a temperature of from 40° to 70° C., for 60 minutes. A portion of the high polymerization mixture was sampled and the resultant polymer was isolated from the sample. The polymer exhibited an intrinsic viscosity ($\eta$ inh) of 1.75. Also, it was found that the high polymerization mixture contains precipitates of $NH_4Cl$.

The high polymerization mixture was mixed with 180.3 g of calcium hydroxide having a degree of purity of 99% by weight, and the mixture was kneaded to provide a polymer composition. The polymer composition contained 24.0 parts by weight of the resultant polymer, 76.0 parts by weight of NMP, 3.6 parts by weight of $CaCl_2$ and 1.2 parts by weight of water.

The amount of $CaCl_2$ corresponded to 13% by weight of the above-specified imaginary amount of $CaCl_2$. The composition was defoamed at a temperature of 70° C. to prepare a clear spinning solution containing no foam. A spinning process for the spinning solution was carried out as follows.

The spinning solution was extruded through a spinning orifice having 100 circular holes, each having a diameter of 0.08 mm, into an aqueous coagulating solution containing 43% by weight of calcium chloride and heated to a temperature of 75° C., at an extruding rate of 5.04 ml/min. The streams of the extruded spinning solution were converted to filaments in the coagulating solution, and the filaments were washed at a velocity of 10 m/min with hot water in a plurality of washing baths; then, drawn in a water bath at a draw ratio of 2.4; and, finally, heat drawn at a draw ratio of 1.8 and at a temperature of 360° C.

The resultant filaments exhibited the following properties:

| | |
|---|---|
| Denier | 2.5 |
| Tensile strength | 5.0 g/d |
| Ultimate elongation | 20% |
| Modulus | 100 g/d |

EXAMPLE 2

In each experiment in this example, the same procedure as those in Example 1 were carried out, except that in the prepolymerization step, the molar ratio IPC/mPDA was as indicated in Table 1 and the concentration of mPDA in NMP was varied from 0.47 to 1.48 moles/l as indicated in Table 1.

After blowing ammonia gas into the prepolymer solution, the resultnat $NH_4Cl$ was separated by means of a centrifugal separator having a rotation radius of 7.3 cm, at a rotation number of 3,000 r.p.m, for 10 minutes, at a temperature of 50° to 60° C. The amount of the prepolymer in the cake of the separated $NH_4Cl$ was determined by removing $NH_4Cl$ and NMP with water from the cake, and by drying the retaining prepolymer.

TABLE 1

| | (Molar ratio IPC/mPDA = 68.0%) | | | | |
|---|---|---|---|---|---|
| | Concentration of mPDA in NMP in prepolymerization (mole/l) | Composition of prepolymer filtrate | | Weight ratio of prepolymer in separated $NH_4Cl$ cake to entire prepolymer | Solution(*) viscosity of prepolymer solution (poise) |
| Experiment No. | | Prepolymer (w %) | NMP (w %) | | |
| 1 | 0.47 | 8.4 | 91.6 | <0.7 | <1 |
| 2 | 0.74 | 12.7 | 87.3 | <0.8 | <1 |
| 3 | 1.05 | 17.1 | 82.9 | <1.1 | <1 |
| 4 | 1.18 | 18.9 | 81.1 | <3.5 | <1 |
| 5 | 1.33 | 20.7 | 79.3 | <4.4 | <1 |
| 6 | 1.48 | 22.5 | 77.5 | 5.3 | 1 |

Note:
(*)determined at 50° C.

EXAMPLE 3

In each experiment in this example, the same procedures as those described in Example 1 were carried out, except that in the prepolymerization step, the molar ratio IPC/mPDA was varied from 68.0 to 98.5 as indicated in Table 2, and the concentration of mPDA in NMP was 1.33 moles/l.

TABLE 2

(Concentration in PDA in NMP = 1.33 mole/l)

| Experiment No. | Molar ratio IPC/mPDA | Composition of prepolymer filtrate prepolymer (w %) | Composition of prepolymer filtrate NMP (w %) | Weight ratio of prepolymer in separated NH₄Cl cake to entire prepolymer | Solution(*) viscosity of prepolymer solution (poise) |
|---|---|---|---|---|---|
| 7 | 68.0 | 20.7 | 79.3 | 4.4 | <1 |
| 8 | 80.0 | 22.0 | 78.0 | 7.5 | 1 |
| 9 | 90.0 | 23.0 | 77.0 | 9.4 | 2 |
| 10 | 95.0 | 23.5 | 76.5 | 12.9 | 8 |
| 11 (Comparative) | 98.5 | 23.9 | 76.1 | 35.9 | >50 |

Note:
(*)determined at 50° C.

In Experiment 11 (Comparative), it was observed that, even after applying the centrifugal separating operation to the prepolymer solution for 10 minutes, the separated NH₄Cl fraction was in the state of a liquid. That is, the separated NH₄Cl fraction contained a large amount of the prepolymer, and the separating rate was very low. Also, it was very difficult to recover the prepolymer from the NH₄Cl fraction.

EXAMPLE 4

In this example, several experiments were carried out in the same manner as that described in Example 1, except that in the prepolymerization step, the molar ratio IPC/mPDA was 78.5% and the concentration of mPDA in NMP was 1.28 moles/l. Also, in the removing step (B) in each of the experiments, the first neutralizing procedure of the prepolymer solution was carried out to such an extent that a mixture of 10 g of the neutralized solution with 200 ml of ion-exchanged water exhibits a pH within the range of from 3 to 8. The deposited NH₄Cl was removed from the neutralized solution by means of a leaf filter equipped with a polyester felt under pressure. The concentrations of HCl and NH₄Cl retained in the filtrate were determined.

Figure 2:
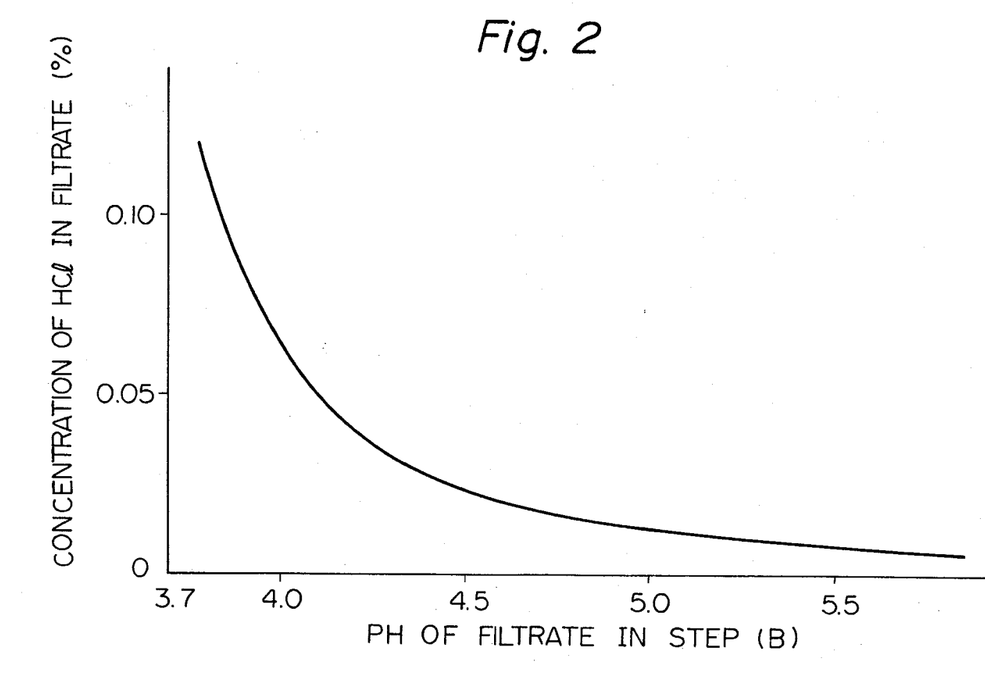
FIG. 2 is a graph showing the relationship between the pH of a filtrate obtained in the removing step (B) and the concentration of hydrogen chloride in the filtrate.
Figure 3:
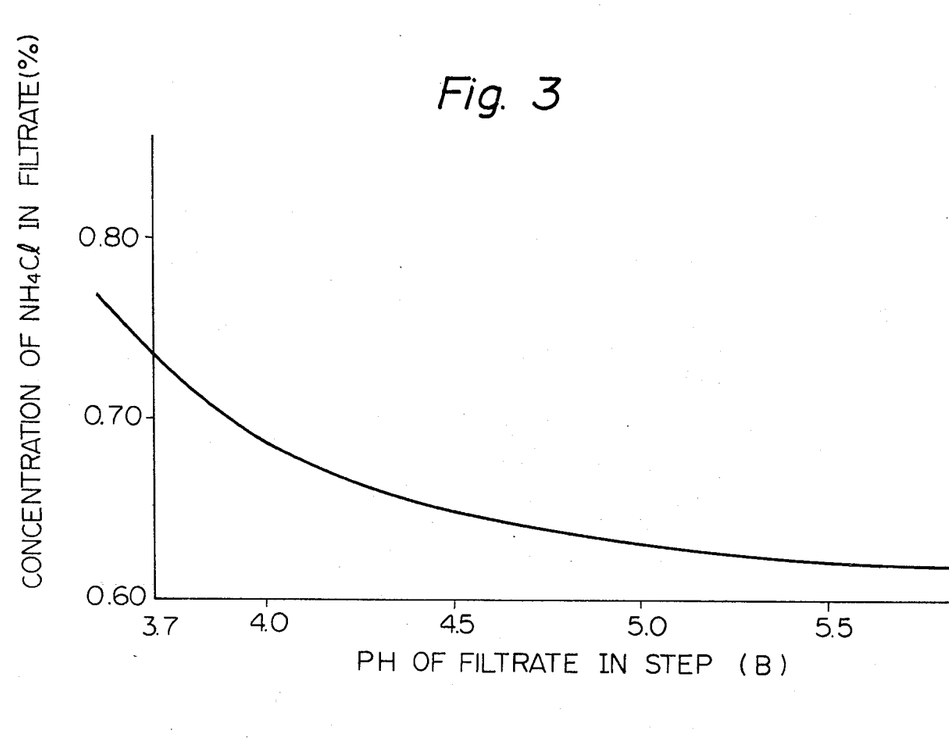
FIG. 3 is a graph showing the relationship between the pH of a filtrate obtained in the removing step (B) and the concentration of NH$_4$Cl in the filtrate.

The relationship between the pH of the neutralized prepolymer solution and the concentration of HCl in the filtrate is shown in FIG. 2. Also, the relationship between the pH of the neutralized prepolymer solution and the concentration of NH₄Cl in the filtrate is shown in FIG. 3.

EXAMPLE 5

In this example, several experiments were carried out in the same manner as that described in Example 1, except that in the prepolymerization step of each experiment, the molar ratio IPC/mPDA was 85.0% and the concentration of mPDA in NMP was 1.28. Also, in the removing step in each experiment, the first neutralizing procedure of the prepolymer solution was carried out to such an extent that a mixture of 10 g of the neutralized solution with 200 ml of ion-exchanged water exhibits a pH within the range of from 5 to 7.5. The neutralized prepolymer solution was filtered in the same manner as that mentioned in Example 4.

It was found that the concentration of NHCl₄ in the filtrate was within the range of from 0.65 to 0.68%.

The filtrate was subjected to the same high polymerization procedure as described in Example 1. The resultant polyamide solution contained a polyamide having an intrinsic viscosity of 1.78.

Figure 4:
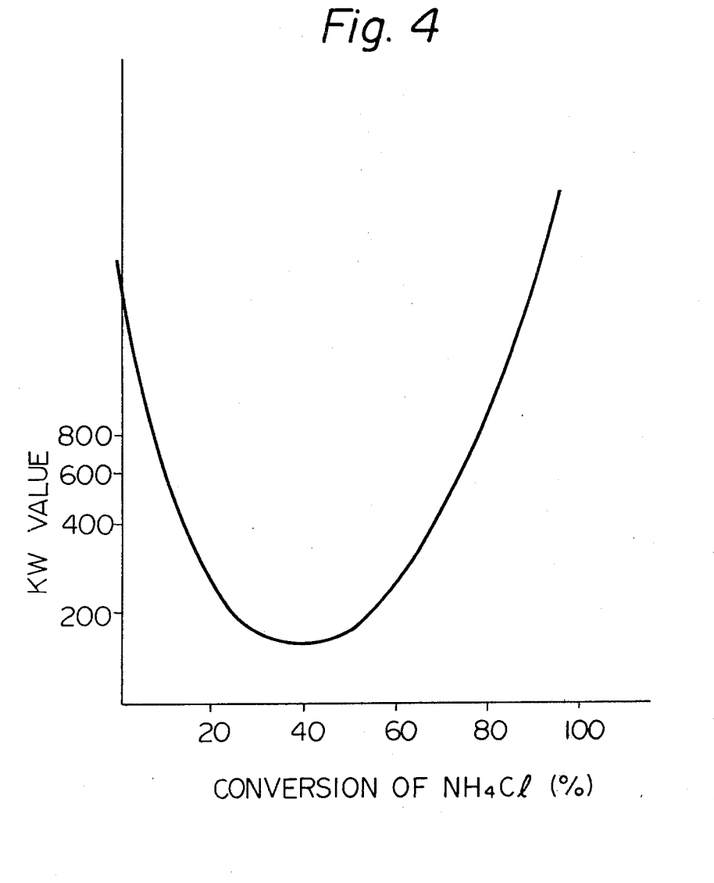
FIG. 4 is a graph showing the relationship between the conversion in % of the residual NH$_4$Cl in the polyamide solution and the filtering property (KW value) of the resultant polyamide composition.

The filtrate was subjected to the second neutralizing procedure in which the entire amount of HCl and 10 to 90% of the NH₄Cl in the filtrate were converted to CaCl₂. The resultant polyamide composition was subjected to a filtration test. The relationship between the amount of the converted NH₄Cl and the filtration property (KW value) of the polyamide composition is indicated in FIG. 4.

The KW value was determined in accordance with the following equation:

$$KW = \frac{2 - (W_{i+1} + W_{i+2})/W_i}{(W_i + W_{i+1} + W_{i+2})} \times 10^5$$

wherein $W_i$ represents an amount of the filtrate obtained in the 6 minute filtration step which occurs 12 minutes after the start of the filtration procedure; $W_{i+1}$ represents an amount of the filtrate obtained in the next 6 minute filtration step occurring after the $W_i$ step; and $W_{i+2}$ represents an amount of the filtrate obtained in the next 6 minute filtration step occurring after the $W_{i+1}$ step.

We claim:

1. A process for preparing a cyclic amide polymer-amide polar solvent composition, which process comprises the steps of:
   (A) prepolymerizing, in an amide organic polar solvent, at least one cyclic diamine selected from the group consisting of aromatic diamines and heterocyclic diamines which are neither ortho nor peri oriented, with at least one cyclic dicarboxylic acid chloride selected from the group consisting of aromatic dicarboxylic acid chlorides and heterocyclic dicarboxylic acid chlorides which are neither ortho nor peri oriented, in a molar equivalent less than that of said cyclic diamine, to prepare a prepolymer solution containing a by-product consisting of hydrogen chloride;
   (B) removing at least a portion of said hydrogen chloride from said prepolymer solution by first neutralizing it with ammonia and, then, separating the resultant precipitate consisting of ammonium chloride from said prepolymer solution by means of filtration, to prepare a prepolymer filtrate;
   (C) high polymerizing said prepolymer in said prepolymer solution with an amount of at least one cyclic dicarboxylic acid chloride selected from the group consisting of aromatic and heterocyclic dicarboxylic acid chlorides in addition to that used in the prepolymerizing step, to prepare a polyamide solution containing a by-product consisting of hydrogen chloride, and;
   (D) converting the entire amount of said hydrogen chloride in said polyamide solution to a salt, which is soluble in said amide type polar solvent and capable of enhancing the solubility of said polyamide in said amide polar solvent, with a neutralizing agent, to provide a cyclic amide polymer composition, and which process is characterized in that:
      (a) in said prepolymerization step (A), the resultant prepolymer solution exhibits a solution viscosity of 20 poise or less at a temperature of 50° C.;
      (b) in said removing step (B), said first neutralizing procedure of said prepolymer solution with ammonia is carried out to such an extent that a mixture of 10 g of the resultant neutralized mixture with 200 ml of ion-exchanged water exhibits a pH of from 3.7 to 8.0, and;

(c) in said conversion step (D), 10 to 70% of the hydrogen chloride contained in said polyamide solution is also converted with said neutralizing agent into said amide polar solvent-soluble salt, and the entire amount of said amide polar solvent-soluble salt corresponds to from 5 to 95% by weight of the theoretical amount of said amide polar solvent-soluble salt to be derived from the entire amount of said cyclic dicarboxylic acid chloride used in said prepolymerization step (A) and said high polymerization step (C).

2. A process as claimed in claim 1, wherein said cyclic amide polymer is a poly-m-phenyleneisophthalamide polyamide and the amount of said polar solvent-soluble salt produced in said conversion step (D) corresponds to 5 to 90% by weight of said theoretical amount of said polar solvent-soluble salt.

3. A process as claimed in claim 1, wherein said cyclic diamine is selected from the group consisting of the compounds of the formulae (I) and (II):

(I)

and (II)

wherein $Ar_1$, $Ar_2$ and $Ar_3$ respectively represent, independently from each other, a member selected from the group consisting of divalent aromatic radicals and divalent heterocyclic radicals, each substituted or unsubstituted with at least one substituent not reactive to a carboxylic acid chloride radical; Y represents a radical selected from the group consisting of —O—, —CO—, —SO—, —SO$_2$—, —CH$_2$—, —CONH—, N-substituted imino and alkylidene radicals; and $R_1$, $R_2$, $R_3$ and $R_4$ respectively represent, independently from each other, a member selected from the group consisting of a hydrogen atom and alkyl radicals having 1 to 10 carbon atoms.

4. A process as claimed in claim 3, wherein said divalent aromatic radical is selected from the group consisting of a single aromatic ring and two or more aromatic rings that are the same as or different from each other, and that are condensed together or are linked together by a single bond or by a bridging atom or radical.

5. A process as claimed in claim 3, wherein said substituent not reactive to the carboxylic acid chloride radical, is selected from the group consisting of halogen atoms and lower alkyl, phenyl, acyl, carboalkoxy, acyloxy, alkoxy, nitro, dialkylamino, thioalkyl, carboxyl and sulfonic acid radicals.

6. A process as claimed in claim 1, wherein said cyclic carboxylic acid chloride is selected from the group consisting of the compounds of the formulae (III) and (IV):

(III)

and (IV)

wherein $Ar_4$, $Ar_5$ and $Ar_6$ respectively represent, independently from each other, a member selected from the group consisting of divalent aromatic radicals and divalent heterocyclic radicals, each substituted or unsubstituted with at least one substituent not reactive to an amino radical; and Y represents a radical selected from the group consisting of —O—, —S—, —CO—, —SO—, —SO$_2$—, —CH$_2$—, —CONH—, N-substituted imino and alkylidene radicals.

7. A process as claimed in claim 6, wherein said divalent aromatic radical is selected from the group consisting of a single aromatic ring and two or more aromatic rings that are the same as or different from each other, and that are condensed together or are linked together by a single bond or by a bridging atom or radical.

8. A process as claimed in claim 7, wherein said substituent not reactive to the amino radical, is selected from the group consisting of halogen atoms and lower alkyl, phenyl, acyl, carboalkoxy, acyloxy, alkoxy, nitro, phenoxy, and thioalkyl radicals.

9. A process as claimed in claim 1, wherein said amide polar solvent consists of at least one compound selected from the group consisting of tetramethyl urea, N,N-dimethylacetamide, N-methyl-2-phrrolidone, N-methyl-2-piperidone, N,N-dimethylethylene urea, N,N,N′,N′-tetramethyl maleic amide, N-methylcaprolactam, N-acetylpyrolidine, N,N-diethylacetamide, N-ethyl-2-pyrrolidone, N,N-dimethylpropionic amide, N,N-dimethylisobutylamide, and N,N-dimethylpropylene urea.

10. A process as claimed in claim 1, wherein said prepolymerization (A) is carried out at a temperature of from −20° to 100° C.

11. A process as claimed in claim 1, wherein said prepolymerization system contains at least one cyclic aminocarboxylic acid hydrogen halide of the formula (V):

(V)

wherein $Ar_7$ represents a member selected from the group consisting of divalent aromatic radicals and divalent heterocyclic radicals, each substituted or unsubstituted with at least one substituent not reactive to a carboxylic acid chloride radical and an amino radical; and $R_5$ represents a member selected from the group consisting of a hydrogen atom and alkyl radicals having 1 to 10 carbon atoms, the valence bonds of said $Ar_7$ radicals being neither ortho nor peri oriented.

12. A process as claimed in claim 11, wherein said divalent aromatic radical is selected from the group consisting of a single aromatic ring and two or more aromatic rings that are the same as or different from each other, and that are condensed together or are linked together by a single bond or by a bridging atom or radical.

13. A process as claimed in claim 11, wherein said substituent not reactive to the carboxylic acid chloride radical and the amino radical is selected from the group consisting of halogen atoms and lower alkyl, phenyl, acyl, carboalkoxy, acyloxy, alkoxy, nitro and thioalkyl radicals.

14. A process as claimed in claim 1, wherein, in said first neutralizing operation, said ammonia is fed in the state of a gas, liquid or solution in said amide solvent, into said prepolymer solution, under an ambient pressure or an increased pressure.

15. A process as claimed in claim 1, wherein said first neutralizing operation is carried out at a temperature of from 0° to 100° C.

16. A process as claimed in claim 1, wherein said polymerizing operation (C) is carried out at a temperature of from −20° to 100° C.

17. A process as claimed in claim 1, wherein said prepolymer filtrate is a mixture of two or more different prepolymer filtrates, each containing a prepolymer different from each other.

18. A process as claimed in claim 1, wherein said polymerization system contains at least one aromatic aminocarboxylic acid hydrogen halide of the formula (V):

Hydrogen halide.R$_6$HN—Ar$_8$—COCl    (V)

wherein Ar$_8$ represents at least one member selected from the group consisting of divalent aromatic radicals and divalent heterocyclic radicals which are neither ortho nor peri oriented, and, each of which is substituted or unsubstituted with at least one substituent not reactive to a carboxylic acid chloride radical and an amino radical, and R$_6$ represents a member selected from the group consisting of a hydrogen atom and alkyl radicals having 1 to 10 carbon atoms.

19. A process as claimed in claim 1, wherein said neutralizing agent comprises at least one compound selected from the group consisting of oxides, hydroxides, hydrogenated compounds and carbonates of metals of Groups I and II in the Periodic Table.

20. A process as claimed in claim 1, wherein said converting operation (D) is carried out at a temperature of from 0° to 150° C.

21. A process as claimed in claim 1, wherein said converting operation (D) is carried out while stirring said composition.

22. A process as claimed in claim 1, wherein said polar solvent-soluble salt in said composition is selected from the group consisting of hydrochloric acid salts of metals of Groups I and II in the Periodic Table.

23. A process as claimed in claim 2, wherein said poly-m-phenyleneisophthalamide polyamide contains 85 molar % or more of at least one repeating unit selected from the group consisting of those of the formulae (VI) and (VII):

—NR$_7$—Ar$_9$—NR$_8$CO—Ar$_{10}$—CO—    (VI)

and

—NR$_9$—Ar$_{11}$—CO—    (VII)

wherein Ar$_9$, Ar$_{10}$ and Ar$_{11}$ respectively represent, independently from each other, a divalent aromatic radical substituted or unsubstituted with at least one substitutent, the valence bonds of the aromatic radicals, which radicals are in an amount corresponding to at least 30 molar % of the entire aromatic radicals, being neither ortho nor peri oriented; R$_7$, R$_8$ and R$_9$ respectively represent a member selected from the group consisting of a hydrogen atom and alkyl radicals having 1 to 10 carbon atoms.

24. A process as claimed in claim 23, wherein Ar$_9$, Ar$_{10}$ and Ar$_{11}$ are respectively selected, independently from each other, from the group consisting of 1,3-phenylene, 3,3'-biphenylene, 3,4'-biphenylene, 1,3-naphthylene, 1,6-naphthylene, radicals and radicals of the formulae:

and wherein X represents a radical selected from the group consisting of —O—, —CH$_2$—, —SO$_2$—, —S— and —CO—.

25. A process as claimed in claim 1, wherein said polymerization (C) is terminated with a polymerization terminator comprising at least one compound selected from the group consisting of ammonia and compounds of the formula (X):

Z$_1$—R—(Z$_2$)$_n$    (X)

wherein R represents a hydrocarbon radical having 2 or 3 valence bonds; Z$_1$ represents a radical selected from the group consisting of radicals of the formula —NHR$_{13}$, in which R$_{13}$ represents a member selected from a hydrogen atom and lower alkyl radicals having 1 to 10 carbon atoms, —OH—, —COX$_1$— wherein X$_1$ represents a halogen atom, —NCO, —SO$_2$X$_2$ in which X$_2$ represents a halogen atom, —CHO, —NCS, —SH and —CONHNH$_2$; Z$_2$ represents a member selected from the group consisting of a hydrogen atom, halogen atoms, nitro radicals, alkoxy radicals and lower alkyl radicals having 1 to 10 carbon atoms, and n represents an integer of 1 or 2.

26. A process as claimed in claim 25, wherein said compound of the formula (X) is selected from the group consisting of aniline, toluidine, N-methylaniline, N-methyltoluidine, benzoic acid chloride, benzene sulfonic acid chloride, phenylisocyanate, p-nitrophenol, benzaldehyde, nitrophthalic anhydride and nitrosuccinic anhydride.

27. A process as claimed in claim 25, wherein said polymerization terminator is used in an amount of from 0.05 to 1.0 molar %, based on the amount of said aromatic diamine component in said polymerization system.

28. A process as claimed in claim 25, wherein said polymerization terminator is added to said polymerization system within 30 minutes from the start of the polymerization.

29. A process as claimed in claim 25 wherein Z$_1$ and Z$_2$ are bonded to each other to form a carboxylic anhydride group of the formula,

* * * * *

UNITED STATES PATENT AND TRADEMARK OFFICE
CERTIFICATE OF CORRECTION

PATENT NO. : 4,389,521

DATED : June 21, 1983

INVENTOR(S) : Keizo Shimada et al.

It is certified that error appears in the above-identified patent and that said Letters Patent is hereby corrected as shown below:

Column 20, line 33, "peri" should read -- para --.

line 38, "peri" should read -- para --.

line 58, delete "type".

Column 21, line 5, "hydrogen chloride" should read -- $NH_4Cl$ --.

Signed and Sealed this

Thirteenth Day of September 1983

[SEAL]

Attest:

Attesting Officer

GERALD J. MOSSINGHOFF

Commissioner of Patents and Trademarks